US009544528B2

(12) United States Patent
Gharachorloo et al.

(10) Patent No.: US 9,544,528 B2
(45) Date of Patent: Jan. 10, 2017

(54) MATRIX SEARCH OF VIDEO USING CLOSED CAPTION INFORMATION

(75) Inventors: Nader Gharachorloo, Ossining, NY (US); Afshin Moshrefi, Newburyport, MA (US); Rahul Khushoo, Waltham, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1553 days.

(21) Appl. No.: 12/858,336

(22) Filed: Aug. 17, 2010

(65) Prior Publication Data

US 2012/0047534 A1    Feb. 23, 2012

(51) Int. Cl.
*H04N 5/76* (2006.01)
*H04N 5/782* (2006.01)
*H04N 21/433* (2011.01)
*H04N 21/472* (2011.01)
*H04N 21/482* (2011.01)
*H04N 5/765* (2006.01)
*H04N 9/82* (2006.01)

(52) U.S. Cl.
CPC ............... *H04N 5/76* (2013.01); *H04N 5/782* (2013.01); *H04N 21/4334* (2013.01); *H04N 21/47214* (2013.01); *H04N 21/4828* (2013.01); *H04N 5/765* (2013.01); *H04N 9/8205* (2013.01); *H04N 9/8227* (2013.01)

(58) Field of Classification Search
USPC ........................................................ 725/53
See application file for complete search history.

(56) References Cited

U.S. PATENT DOCUMENTS

| 7,797,711 | B2 * | 9/2010 | Iwamura | 725/37 |
| 2003/0030752 | A1 * | 2/2003 | Begeja et al. | 348/563 |
| 2003/0093814 | A1 * | 5/2003 | Birmingham | 725/136 |
| 2004/0040041 | A1 * | 2/2004 | Crawford | 725/88 |
| 2004/0055006 | A1 * | 3/2004 | Iwamura | 725/37 |
| 2008/0046925 | A1 * | 2/2008 | Lee et al. | 725/37 |

OTHER PUBLICATIONS

Screen shot showing Google Video Search homepage; printed on Aug. 17, 2010, 1 page.
Screen shot showing result of Bing Video Search for term "Verizon"; printed on Aug. 17, 2010, 1 page.

* cited by examiner

*Primary Examiner* — John Schnurr
*Assistant Examiner* — Christine Kurien

(57) ABSTRACT

Closed caption data for video programs, such as television programs, may be used to implement a video search. In one implementation, a device may perform a search to obtain video programs that are relevant to the search. The search may be performed using an index generated from closed caption data of video programs. The device may additionally present the video programs that are relevant to the search as a matrix of reduced-in-size images sampled from the video programs that are relevant to the search query. The images may be sampled from the video programs near a position in the video programs corresponding to the positions at which the search query is relevant to the video program.

4 Claims, 9 Drawing Sheets

| TERM 515 → | PROGRAM IDENTIFIER 520 → |
|---|---|
| LARGE | 6, 10, 50 |
| LIPSTICK | 6, 100 |
| LATE | 1, 25, 30, 85, 110 |

| PROGRAM IDENTIFIER 555 → | TITLE 560 → | LOCATION 565 → |
|---|---|---|
| 6 | "LOCAL NEWS, MAY ..." | LOCAL |
| 10 | "ONE SCARY MOVIE" | VOD |
| 50 | "MARKET REPORT, JUNE 6 ..." | LOCAL |

GOOD BUSINESS COMPANY LAUGHTER FiOS
QUARTER QUESTION CUSTOMERS LOT YEAR
CUSTOMER TIME MARKET VERIZON DENNY MORNING
WIRELESS VOICE NETWORK iPHONE GROWTH COUPLE
BIT CALL NEW PEOPLE YEARS LINE WORK TELECOM
APPLAUSE ISSUE DEAL CHART PRICE TALK COST RESULTS
STOCK EARNINGS CASH PUT LTE PRODUCT COMPANIES WEEK
DEBT CONTINUE FUTURE CONTENT BOTTOM FACT SMALL IVAN
PART REVENUE PLACES SERVICE DAY SERVICES OPPORTUNITY
NUMBER SELL REST RETAIL ALLTEL BUILDING POINT STRATEGY
GREAT NEWS GONNA ANSWER IMPORTANT BOUGHT ACCESS GROUP
SORT CITY verizon business SHARE BIG COMPETE SIDE VIDEO QUESTIONS
SERVE BUY MILLION APPLE CREATE stock price BIGGER DAYS DATA
MAKING AUDIENCE EXPO POSITION FOCUS

MATRIX SEARCH OF VIDEO USING CLOSED CAPTION INFORMATION

BACKGROUND

Recently, consumers of video content have benefited from a variety of technologies that improve the recording and viewing of video streams. Set-top boxes (STBs) and digital video recorders (DVRs) may allow a user to browse listings of upcoming video programming through a dynamically updated programming guide. DVRs may allow for the recording and playing back of video programming.

Users of STBs and/or DVRs may desire to search for video programs. For example, a user may desire to enter keywords to search for video content. In existing STBs/DVRs, the keyword search may be performed to locate programming in which the title of the program matches the entered keywords.

BRIEF DESCRIPTION OF THE DRAWINGS

FIGS. 5A and 5B are diagrams illustrating example data structures that may be used by the functional components shown in FIG. 3;

FIG. 9 is a diagram illustrating an example of a graphical interface that presents a tag cloud for a video program.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may relate to searching of video programming and presentation of the search results. In one implementation, video programs may be searched based on closed caption information corresponding to the video programs. The search results may be displayed in a two-dimensional matrix format that presents a number of possible results to the user, potentially allowing the user to efficiently choose the video program in which the user is interested in viewing.

Figure 1:
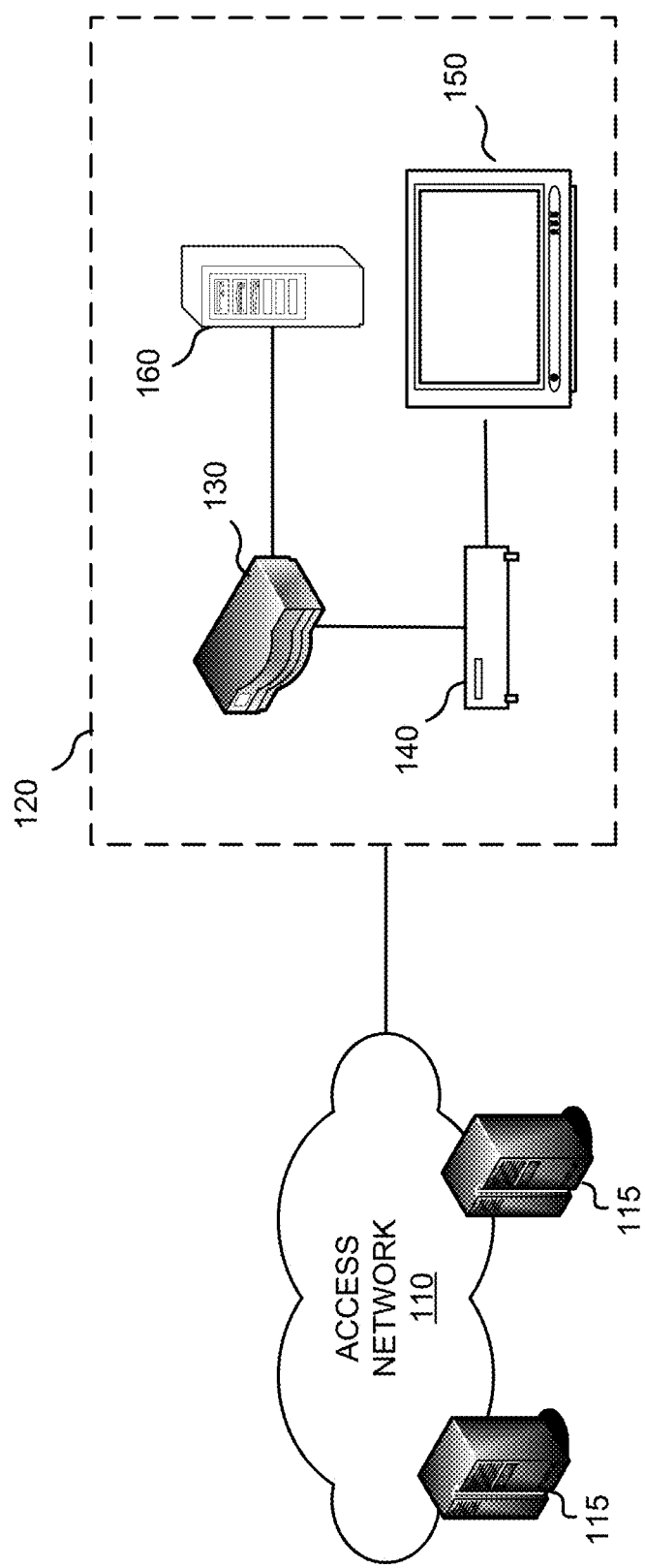
FIG. 1 is a diagram of an example environment in which systems and/or methods described herein may be implemented.

FIG. 1 is a diagram of an example environment 100 in which systems and/or methods described herein may be implemented. As illustrated, environment 100 may include an access network 110 that provides telecommunication services, such as television programming, to customer premises 120. Access network 110 may include, for example, a network that delivers information over fiber optic cables, coaxial cables, or a network that delivers information over another form of wired or wireless connections. In one possible implementation, access network 110 may include an over-the-air broadcast network or a hybrid network, such as a hybrid fiber-coaxial network. Customer premises 120 may include one or more devices connected to access network 110. In the example shown in FIG. 1, customer premises 120 is connected to access network 110 through a wired connection, such as a fiber optic connection. As shown, customer premises 120 may include a gateway 130, a digital video recorder (DVR) 140, a video display device 150, and a computing device 160.

Access network 110 may include or be connected to one or more servers 115. Servers 115 may be computing devices or groups of computing devices that may be used to provide services to customer premises 120. For example, servers 115 may provide programming guide data (e.g., an electronic program guide (EPG) or an interactive program guide (IPG)) to customer premises 120. In some implementations described herein, servers 115 may provide search services to customer premises 120, such as search services that search closed caption text of video programs.

Gateway 130 may include a network device that provides an interface from access network 110 to DVR 140 and computing device 160. When telecommunication services are provided to customer premises 120 via an optical fiber, gateway 130 may include an optical network terminal (ONT) that connects to the optical fiber. The ONT may convert signals between DVR 140 and access network 110. Gateway 130 may also include an Ethernet output port that connects to computing device 160 or to a voice-over-Internet protocol (VoIP) telephone. In some implementations, gateway 130 may be omitted or the functionality of gateway 130 may be integrated into DVR 140.

DVR 140 may include a device that generally operates to record video in a digital format to a computer memory, such as a disk drive, a flash drive, or other memory medium. DVR 140 may be a stand-alone set-top box (STB), a portable media player (PMP) and recorder, or software on personal computers which enables video capture and playback to and from disk. In some implementations, DVR 140 may be implemented as an integrated part of video display device 150. In general, the operations of DVR 140, as described herein, may be performed on any device capable of buffering video.

Video display device 150 may include any device capable of receiving and reproducing video signals. In one implementation, video display device 150 may include a television. In another implementation, video display device 150 may include, for example, a display of a stationary communication device (e.g., a computer monitor or a telephone), or a display of a portable communication device (e.g., a mobile telephone or a personal digital assistant (PDA)).

Computing device 160 may include a personal computer or other computing device, such as, for example, a desktop computer, a laptop computer, a PDA, etc., used for general computing tasks.

FIG. 1 shows an example of components that may be included in environment 100. In other implementations, environment 100 may include fewer, different, differently arranged, or additional components than depicted in FIG. 1. Alternatively, or additionally, one or more components of environment 100 may perform one or more tasks described as being performed by one or more other components of environment 100.

Figure 2:
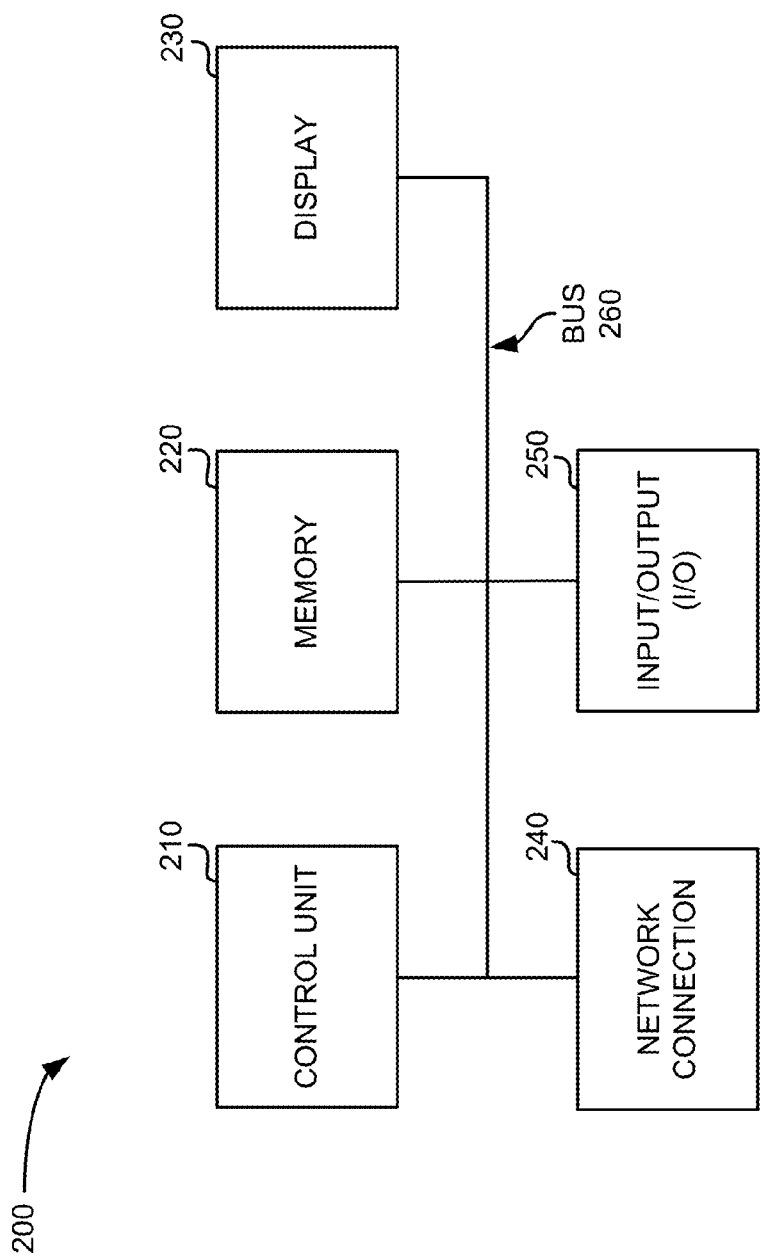
FIG. 2 is a diagram illustrating an example device that may correspond to a server or DVR of FIG. 1.

FIG. 2 is a diagram illustrating an example of a device 200 that may correspond to one of servers 115 and/or DVR 140. As shown, device 200 may include a control unit 210, a memory 220, a display 230, a network connection 240, an input/output (I/O) component 250, and a bus 260.

Control unit 210 may include a processor, microprocessor, or another type of processing logic that interprets and executes instructions. Among other functions, control unit 210 may decode video received from access network 110 and provide an interface through which a user may interact with video programming, such as an interface for rewinding a program.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 230 may include any component capable of providing visual information. For example, in one implementation, display 230 may be a light emitting diode (LED) array or a liquid crystal display (LCD). Display 230 may display, for example, text (such as a time, a date or a channel selection), image, and/or video information.

Network connection 240 may include any transceiver-like mechanism that enables DVR 140 to communicate with other devices and/or systems. For example, network connection 240 may include an Ethernet interface, an optical interface, a coaxial interface, a radio interface, or the like. Network connection 240 may allow for wired and/or wireless communication. Network connection 240 may be configured to connect DVR 140 to access network 110.

Input/output devices 250 may generally include user input devices such as external buttons, and output devices, such as LED indicators. With input/output devices 250, a user may generally interact with DVR 140. In some implementations, input/output devices 250 may be implemented via a remote control. A remote control may include a range of devices that provide, for example, function-specific keys, number keys, and/or a full-text keypad. Bus 260 may provide an interface through which components of DVR 140 can communicate with one another.

As will be described in detail below, DVR 140 may perform certain operations relating to the searching of video content. DVR 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of device 200, in other implementations, device 200 may include fewer, additional, different and/or differently arranged components than those depicted in FIG. 2. Alternatively, or additionally, one or more components of device 200 may perform one or more other tasks described as being performed by one or more other components of device 200.

In the description that follows, operations of DVR 140 will be described to implement the searching and presentation of video content. Video content relevant to a search may be displayed in a matrix format through which a user may select a desired video clip.

Figure 3:
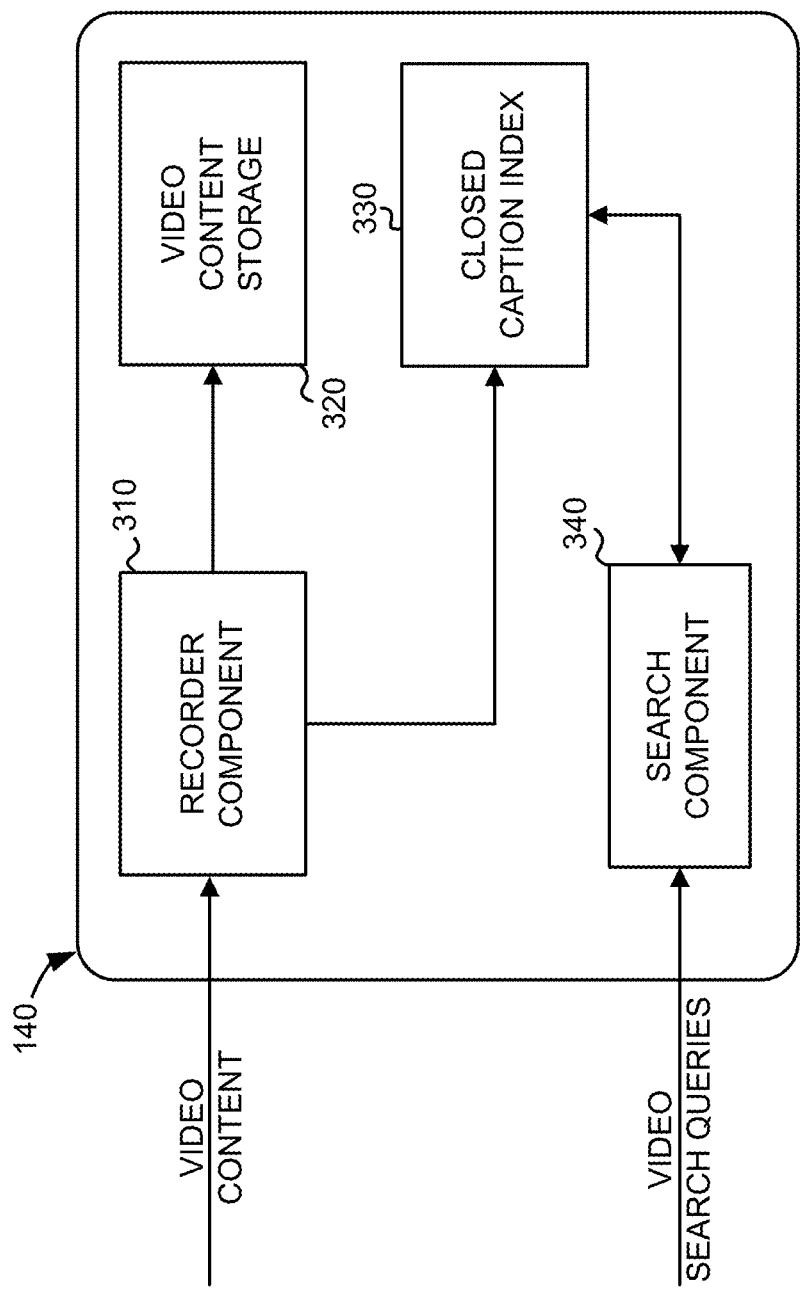
FIG. 3 is a diagram conceptually illustrating an example of functional components of a DVR for searching video content according to a first implementation.

FIG. 3 is a diagram conceptually illustrating an example of functional components of DVR 140 for searching video content according to a first implementation. As shown, DVR 140 may include a recorder component 310, video content storage 320, a closed caption index 330, and a search component 340.

Recorder component 310 may include logic to record (store) video content specified by the user. Recorder component 310 may, for example, receive video content, such as video content from access network 110, and store the video content in video content storage 320. Video content storage 320 may include a non-volatile storage device, such as a hard drive included in memory 220. In some implementations, DVR 140 may include multiple tuners. In these implementations, recorder component 310 may be capable of simultaneously recording multiple video programs.

Video content received by recorder component 310 may include closed caption data. In some jurisdictions, for instance, closed caption data must be included in all television broadcasts. The closed caption data may include a textual transcription of a spoken portion of a television program. For analog television broadcasts, the text transcription of the broadcast may be embedded in a certain line in a video frame. For digital broadcasts, the text transcription of the broadcast may be encoded as part of the encoded data stream, such as an MPEG-2 data stream. Recorder component 310 may output the closed caption data (i.e., the text transcription of the video program) to closed caption index component 330.

Closed caption index component 330 may include logic to store the received closed caption data. The closed caption data may be stored as a searchable index in which words and/or phrases are associated with the video program(s) in which the words/phrases are spoken. Closed caption index component 330 may be updated and maintained by recorder component 310. In response to a search query, closed caption index component 330 may locate video program(s) that match the search query. In one implementation, in addition to locating video programs that match a search query, closed caption index component 330 may also generate score or ranking values that indicate, for the matches, the relative strength of the match. For instance, for a single term search query, a video program in which the term was spoken numerous times may be ranked higher than a video program in which the term was spoken once.

Search component 340 may include logic to receive search queries, such as a search query entered by a user watching a video program on video display device 150. The search query may be entered using a remote control for DVR 140. Alternative techniques could be used to enter a search query, such as search queries entered through another device, such as a smart phone, a laptop, or a "pad" computing device; search queries that were previously saved; or search queries received from another device or user. In response to a received search query, search component 340 may access closed caption index component 330 to obtain a list of one or more video programs that match the search query. Search component 340 may present the search results in a matrix format on video display device 150.

Figure 4:
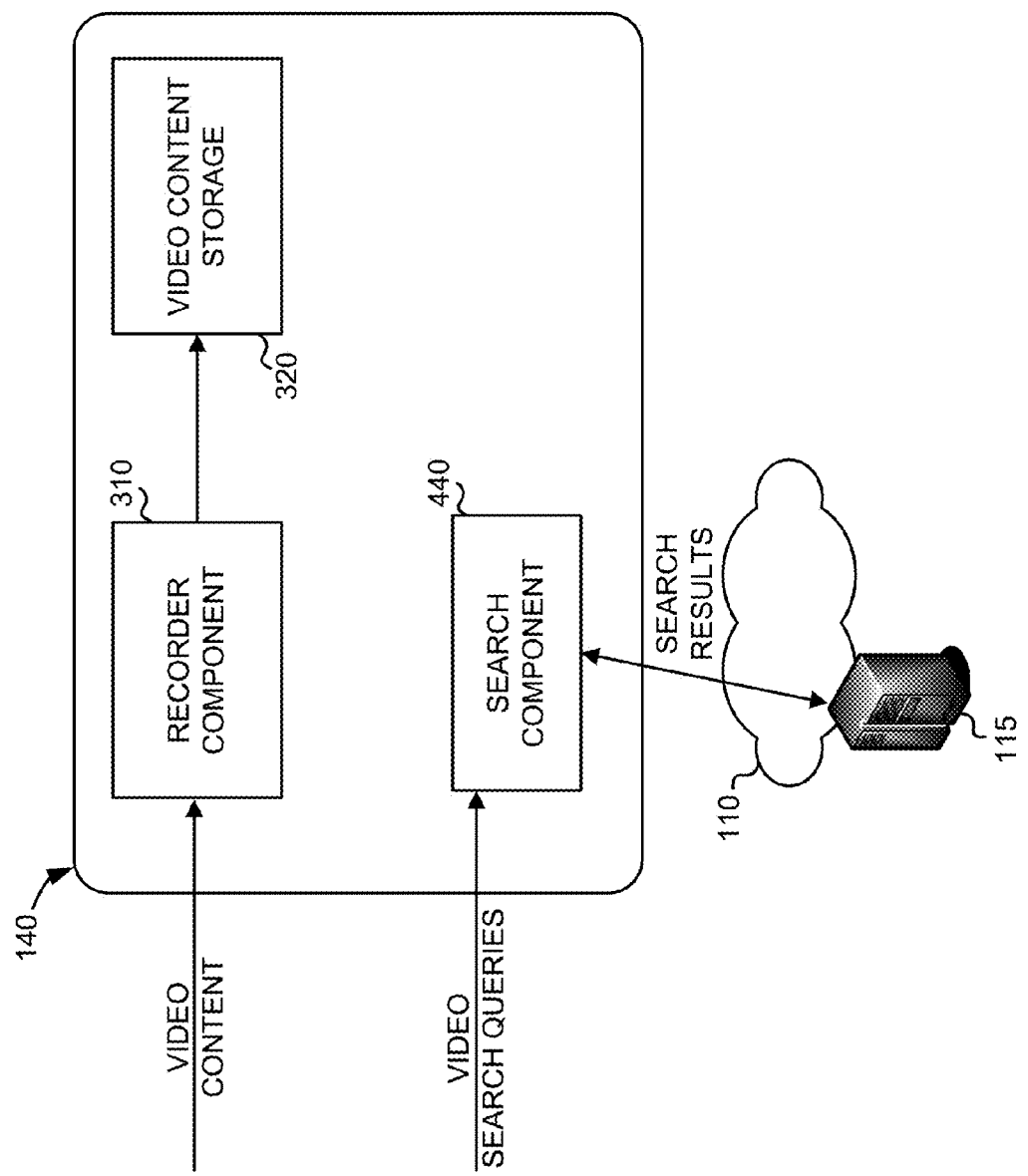
FIG. 4 is a diagram conceptually illustrating an example of functional components of a DVR for searching video content according to a second implementation.

FIG. 4 is a diagram conceptually illustrating an example of functional components of DVR 140 for searching video content according to a second implementation. Search queries input to DVR 140 shown in FIG. 4 may be processed remotely by server 115. As with the implementation of FIG. 3, in this implementation, DVR 140 may include recorder component 310 and video content storage 320. DVR 140 may also include a search component 440. In one example, search component 440 may include the features described above in connection with search component 340.

Search component 440 may include logic to receive search queries, such as a search query entered by a user watching a video program on video display device 150. The search query may be entered using a remote control for DVR 140 or using other techniques. In response to a received search query, search component 440 may submit the search query to server 115 via access network 110. Server 115 may implement a closed caption index similar to that implemented by closed caption index component 330. In response to the received search query from search component 440, server 115 may return a list of one or more video programs that match the search query. Search component 340 may present the search results in a matrix format on video display device 150.

Server 115 may be maintained by an entity that provides the television programming to customer premises 120. Server 115 may include a greater selection of indexed video programs than those programs recorded locally by DVR 140.

In an alternative implementation, both the local closed caption index (closed caption index component 330) and the remote index maintained by server 115 may be implemented by DVR 140. For example, search component 340 of DVR 140 may submit a received search query to both closed caption index component 330 and to sever 115. Search component 340 may then present results from both of the searches to the user.

In another alternative implementation, closed caption index component 330 may receive index updates from server 115. In this manner, closed caption index component 330 may index video programs that have not been recorded or decoded locally. For these video programs, closed caption index component 330 or search component 340 may also store an indication of the availability of the video programs (e.g., a video on demand program, an upcoming program, etc.).

FIGS. 3 and 4 show an example of functional components that may be included in DVR 140. In other implementations, DVR 140 may include fewer, different, differently arranged, or additional functional components than depicted in FIGS. 3 and 4. Alternatively or additionally, one or more functional components of DVR 140 may perform one or more tasks described as being performed by one or more other functional components of DVR 140.

FIGS. 5A and 5B are diagrams of example data structures that may be used to search video programs based on closed caption data.

FIG. 5A is diagram illustrating a data structure 510 that may implement a table used by closed caption index component 330. Data structure 510 may be implemented within memory 220 of DVR 140.

Data structure 510 may include term fields 515 and program identifier fields 520. Term fields 510 may store terms or phrases contained in closed caption data of video programs. Each term/phrase may be associated with, in the corresponding program identifier field 520, a list of the video programs in which the term/phrase occurs. In this example, each video program is identified by a numeric identifier (ID). The term "lipstick", for instance, is shown as being present in the video programs that have IDs 6, 10, and 50.

The fields shown in data structure 510 are exemplary. Other or different fields may be included in data structure 510. For example, each row in data structure 510 may also be associated with a field that assigns a relative weight value to each term/phrase, where the weight value of a term may quantify the "importance" of the term/phrase.

FIG. 5B is diagram illustrating a data structure 550 that may be used by closed caption index component 330 or search component 340. Data structure 550 may be implemented within memory 220 of DVR 140.

Data structure 550 may include program identifier fields 555, program title fields 560, and stored location fields 565. Program identifier fields 555 may store numeric identifiers for video programs that correspond to the identifiers stored in program identifier fields 520. Program titles field 560 may store the title of the video program for the program ID in the corresponding program identifier field 555. In some implementations, information about the particular program other than the title may also be stored. Location fields 565 may store an indication of where the corresponding video programs are located and/or the availability of the video program. In FIG. 5B, the values in location fields 565 include "stored locally", which may indicate the video program was recorded by DVR 140 or "VOD", which may mean that the video can be obtained on demand from the entity that provides television services to customer premises 120.

The fields shown in data structure 550 are exemplary. Other or different fields may be included in data structure 550. For example, each row in data structure 550 may also be associated with fields that include additional information about the particular video program, such as ratings or reviews relating to the video program. As another example, timestamps that mark the location of the occurrence of each term/phrase in each video program may also be stored.

Figure 6:
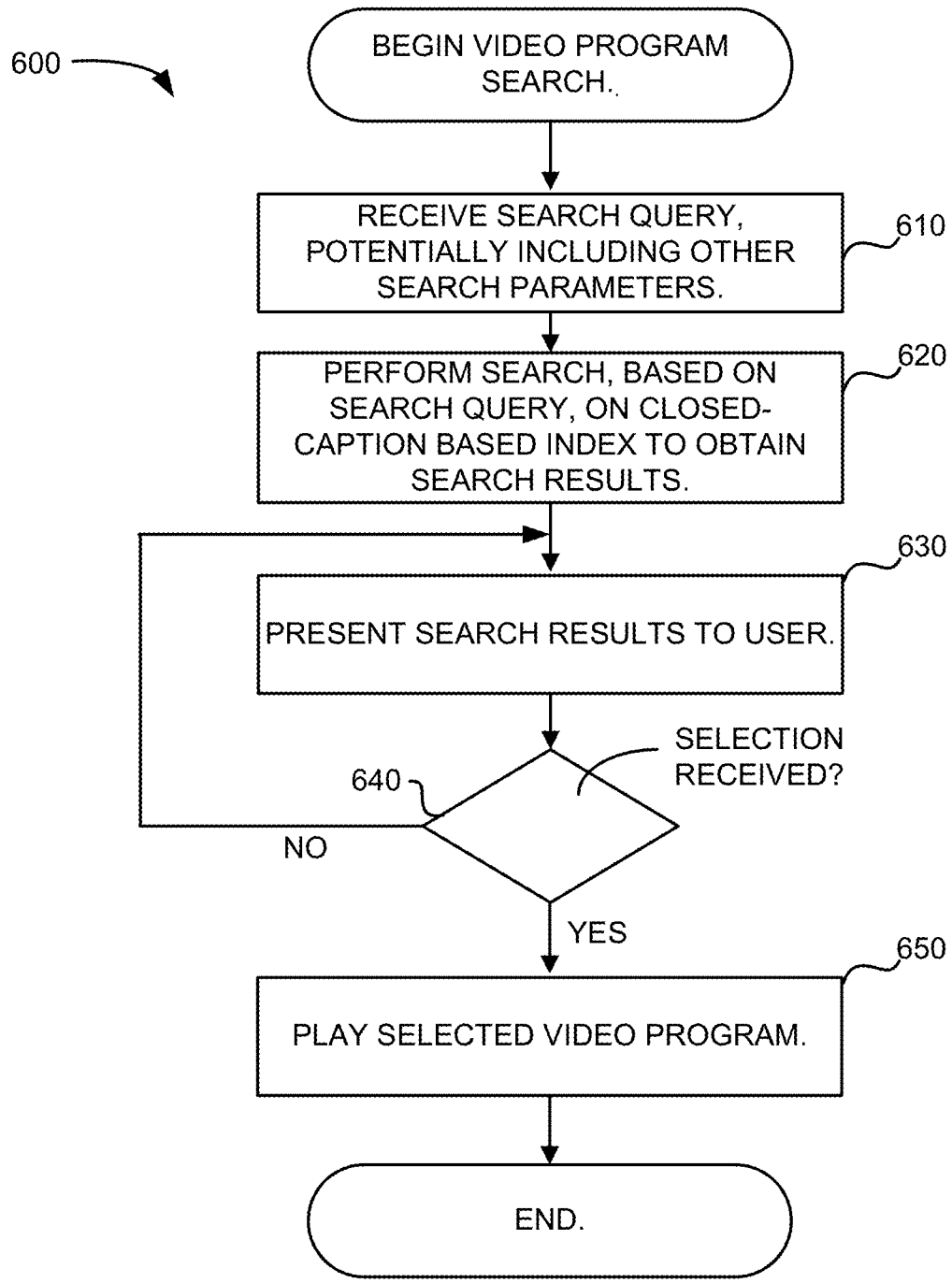
FIG. 6 is a flow chart illustrating an example of a process for performing a video program search.

FIG. 6 is a flow chart illustrating an example of a process 600 for performing a video program search. In one example, process 600 may be performed by DVR 140.

At some point, a user may wish to perform a keyword search to locate one or more video programs of interest. The user may initiate the search by navigating to a search interface using DVR 140. The user may then enter the desired search query.

Process 600 may include receiving the search query entered by the user (block 610). The search query may be associated with other parameters that additionally define the search.

Figure 7:
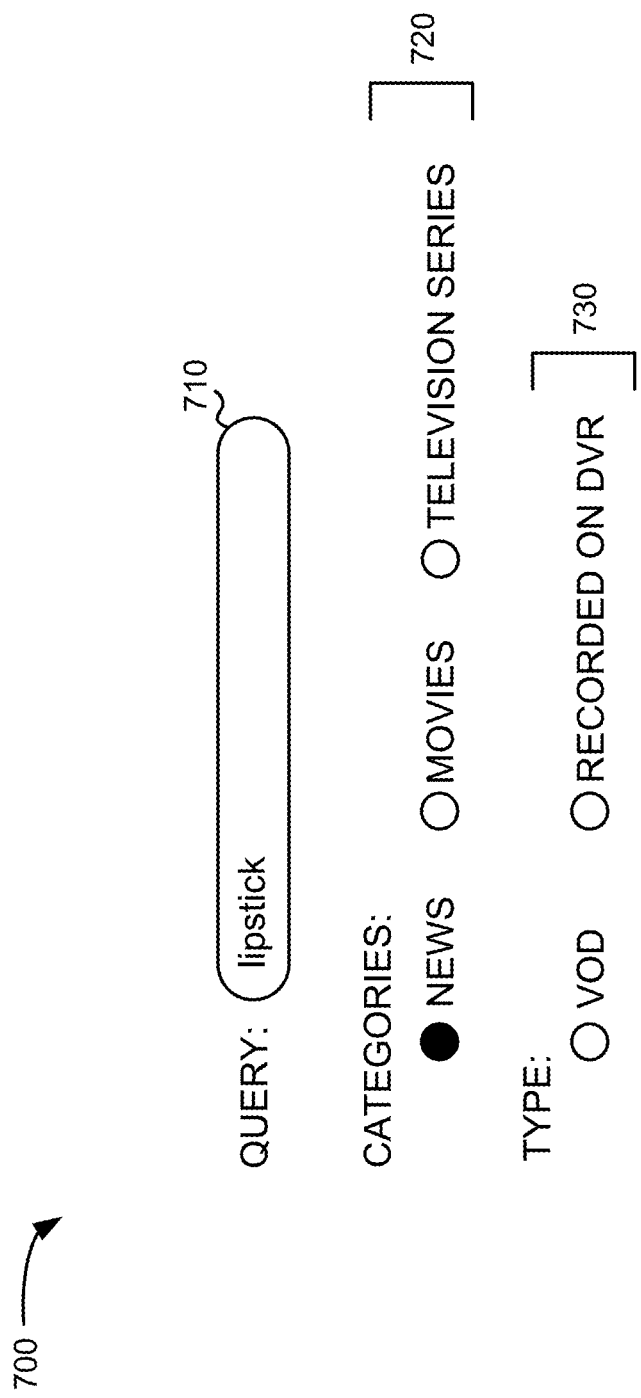
FIG. 7 is a diagram illustrating an example of an interface through which a user may enter a search query.

FIG. 7 is a diagram illustrating an example of an interface 700 through which a user may enter a search query. Interface 700 may be presented, for example, by DVR 140 on video display device 150.

As shown in FIG. 7, interface 700 may include a number of graphical elements through which a user may enter search-related parameters. Interface 700 may particularly include a search box 710, a category selection section 720, and a type selection section 730. In search box 710, a user may enter one or more words or phrases for which the user is interested in searching.

In some implementations, in addition to the search query, a user may specify other parameters that further define the search. In category selection section 720, the user may select one or more categories for the video programs being searched. As illustrated, the video program categories may include a category ("NEWS") that includes news related video programs, a category ("MOVIES") that includes movies, and a category ("TELEVISION SERIES") that includes video programs that are episodes of television series. In type selection section 730, the user may select the storage location and/or availability of the video programs that will be returned in response to a search. As illustrated, the user may select video on demand (VOD), which may include video programs that are stored remotely at servers 115. The user may also select "RECORDED ON DVR", which may limit the search results to only results that are stored locally (e.g., previously recorded video programs) on DVR 140. In the example of FIG. 7, the search query "lipstick" and the category "news" are shown. The user may thus desire to search for news programs in which the word "lipstick" was spoken.

Users may interact with interface 700 using, for example, a remote control, a keypad, or another device. In some implementations, such as when the user is interacting with interface 700 using a remote control that does not include a keyboard, a virtual keyboard may be displayed in interface 700 to allow a user select letters to form a search query. At some point, the user may be satisfied with the entered search query, and may submit the search query, such as by pressing an enter or a submit button on the remote control. The search query may be received by search component 340.

In some implementations, instead of selecting categories of programs to search through interface 700, the user may, through interface 700 or through another interface, select a single video program to search.

Referring back to FIG. 6, process 600 may additionally include performing a search for video programs based on the input search query and the closed caption index (block 620). Search component 340 may, for instance, match the search query to closed caption index 330 to execute the search locally. Alternatively or additionally, search component 340 may send the search query to remote server 115 to implement the search. In some implementations, the search query may be associated with the additional search parameters, such as a category of the desired content.

As a result of performing the search, a list of one or more matching video programs may be obtained. Each matching video program may also include a timestamp indicating a location within the video program at which the search query matched the video program. In some implementations, a single video program may be associated with multiple timestamps if the search query matched the video program at multiple locations. In other implementations, only a single location maybe chosen for each matching video program.

Process 600 may further include presenting the search results to the user (block 630). Search component 340 may, for example, present the search results in a graphical interface on video display device 150.

Figure 8:
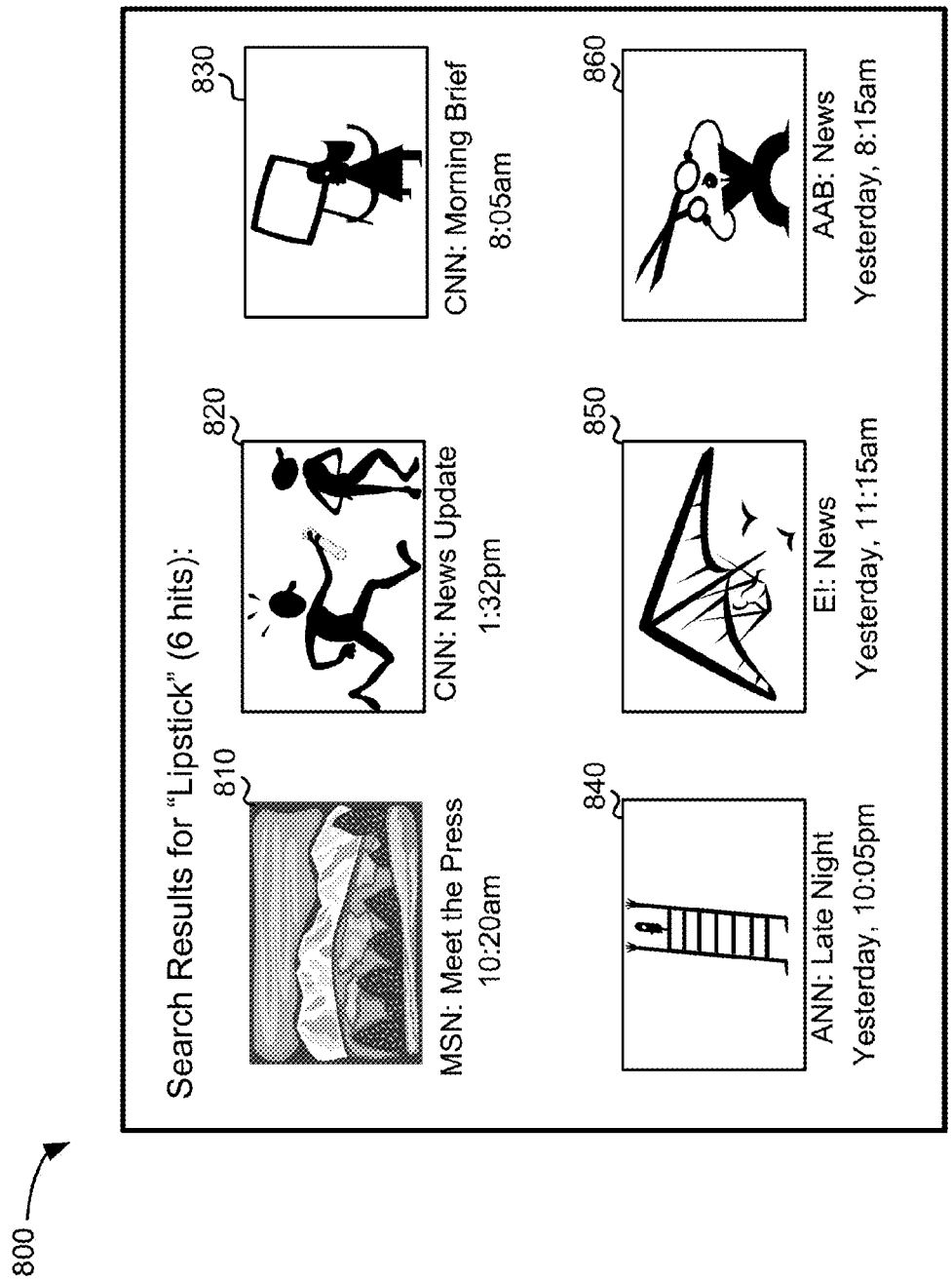
FIG. 8 is a diagram illustrating an example of a graphical interface for presenting search results to a user in a matrix format.

FIG. 8 is a diagram illustrating an example of a graphical interface 800 for presenting search results to a user in a matrix format. Assume that the example results shown in graphical interface 800 are results for the search query "lipstick" in which the search is limited to news related video programs. Six results 810, 820, 830, 840, 850, and 860 are shown. Each result may be visually presented as a reduced-in-size representation of the corresponding video program. The displayed image corresponding to each result may be a reduced-in-size image or frame from the video program that is sampled at or near the timestamp. Text may also be displayed near each result 810-860 to further describe the video program. For result 820, for instance, text is presented that gives the channel and name of the video program (channel "MSN" and television show "Meet the Press") as well as the timestamp (10:20 am) to which the search result corresponds. Selecting or mousing-over a result may cause the video program corresponding to the result to begin playing. The video program may begin playing at or near the timestamp corresponding to the search result. In one implementation, the video program may begin playing at a certain time period, such as 10 seconds, before the timestamp of the search result. Starting the playback before the timestamp of the search result may be useful to provide context for the video program.

Although the six results shown in FIG. 8 (results 810, 820, 830, 840, 850, and 860) are particularly illustrated as corresponding to results from different video programs, in some implementations, multiple ones of the results may correspond to results at different locations in a single video program. For example, two of the results may be search hits within a single news program. As another example, a user may search a single video program and all of the displayed results may correspond to locations within that video program.

In an alternative implementation for presenting graphical interface 800, instead of beginning playback of the reduced-in-size results 810, 820, 830, 840, 850, and/or 860, in response to a user selection of a result (e.g., a mousing-over a result), graphical interface 800 may simultaneously playback each of video programs corresponding to results 810-860. When simultaneously playing back each of the video programs corresponding to the results, audio for the video programs may be muted. In this situation, audio for a particular video program may be played in response to user selection of the corresponding result. Alternatively or additionally, closed caption data for each of the video programs may be simultaneously presented below the results.

FIG. 8 is a diagram illustrating an example of graphical interface 800. In other implementations, graphical interface 800 may include fewer, different, differently arranged, or additional graphical elements than those depicted in FIG. 8.

Referring back to FIG. 6, at some point, a user may select one of the search results (e.g., one of search results 810, 820, 830, 840, 850, or 860) for playback or for further analysis. The selection may be performed using a remote control or other device to indicate that the user would like to play the video program corresponding to the selected result.

DVR 140 may receive the selection (block 640—YES). In response, DVR 140 may play the selected video program (block 650) using, for instance, the normal interface used for watching television. The playback of the video program may be started at a location at or near the timestamp corresponding to the search result.

In some implementations, additional actions may be performed in response to selection of one of search results 810-860. For example, in response to selection of a search result, DVR 140 may present the user with a number of options, in addition to playback, regarding the selected search result. The additional options may include, for example, the display of additional information about the corresponding video program (e.g., an editorial review or description of the program) or the display of a tag cloud based on the closed caption data.

FIG. 9 is a diagram illustrating an example of a graphical interface 900 that presents a tag cloud for a video program. Graphical interface 900 may be presented by DVR 140 in response to a user selecting a tag cloud view for one of search results 810, 820, 830, 840, 850, or 860. The tag cloud view may include a graphical presentation in which terms or phrases from the closed caption data are displayed in a graphical "cloud" where the terms/phrases are organized by frequency of occurrence.

The cloud view shown in graphical interface 900 may display the terms/phrases from a video program in which the term "good" is the most frequently used term (72 times). The term "business" is the next most frequently used term (38 times). "Good" is shown using a large font and "business" is shown using a slighter smaller font. Less frequently used words may be shown using a progressively less distinctive font. The user may use the cloud view to quickly gain an idea of the content associated with the video program.

As described above, closed caption data for video programs, such as television programs, may be used to implement a video search. The results may be displayed in a matrix format, allowing a user to quickly scan the results of a search and chose a video program to view.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 6, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
receiving, by the computing device, a search query from a user;
performing a search, by the computing device and based on the search query, to identify one or more video programs that are relevant to the search query, where the search is performed using an index generated from closed caption data associated with the video programs;
presenting, by the computing device, the video programs that are relevant to the search query as a matrix of reduced-in-size images sampled from the video programs that are relevant to the search query, where the images are sampled from the relevant video programs near a position in the relevant video programs corresponding to the positions at which the search query is relevant to the video programs;
detecting selection by the user of one of the video programs that are presented in the matrix of reduced-in-size images;
playing, in response to the detected selection, the selected video program, beginning at a location in the selected video program that is a predetermined time period before the position in the selected video program at which the search query is relevant; and
where presenting the video programs further includes simultaneously playing each of the presented video programs.

2. The method of claim 1, where simultaneously playing each of the presented video programs includes muting the played video programs and displaying closed caption text corresponding to each of the played video programs.

3. A device comprising:
one or more processors; and
one or more memories, coupled to the one or more processors, the one or more memories storing instructions, that when executed by the one or more processors, cause the one or more processors to;
receive a search query from a user;
look up, using an index generated from closed caption data, one or more video programs that are relevant to the search query,
output a search result interface to the user, the search result interface displaying a plurality of images associated with video programs that were determined by the look up to be relevant to the search query, where each image corresponds to an image that is from a position in the associated video program corresponding to the search query;
receive a selection of one of the plurality of images;
play, beginning from a location corresponding to a predetermined time period before the position in the associated video program corresponding to the search query, the video program corresponding to the selection; and
where, when outputting the search result interface, the one or more processors are further to simultaneously play the video programs corresponding to each of the plurality of images.

4. The device of claim 3, where, when simultaneously playing the video programs, the one or more processors are further to:
mute the played video programs, and
display closed caption text corresponding to each of the played video programs.

* * * * *